United States Patent [19]
Kremsler

[11] Patent Number: 5,730,183
[45] Date of Patent: Mar. 24, 1998

[54] VALVE FOR VENTING A CONTAINER

[75] Inventor: Dieter Kremsler, Spiegelberg, Germany

[73] Assignee: Andreas Stihl, Waiblingen, Germany

[21] Appl. No.: 668,544

[22] Filed: Jun. 21, 1996

[30] Foreign Application Priority Data

Jun. 29, 1995 [DE] Germany ............... 195 23 645.9

[51] Int. Cl.⁶ ................................................. F16K 17/26
[52] U.S. Cl. .............. 137/493.8; 137/853; 220/DIG. 33; 220/89.1; 220/203.28
[58] Field of Search ................... 137/493.9, 493.8, 137/852, 853; 220/DIG. 33, 89.1, 203.28

[56] References Cited

U.S. PATENT DOCUMENTS

| | | | |
|---|---|---|---|
| 2,912,069 | 11/1959 | Dillenburger | 137/493.8 |
| 3,124,488 | 3/1964 | Ruetschi | 137/493.9 |
| 3,138,173 | 6/1964 | Hartman | 137/853 |
| 4,181,146 | 1/1980 | Goglio | 137/493.9 |
| 4,440,308 | 4/1984 | Baker | 220/DIG. 33 |
| 4,696,409 | 9/1987 | Vize | |
| 4,944,425 | 7/1990 | Kasugai | 220/DIG. 33 |
| 5,347,813 | 9/1994 | Yanagi | 137/493.9 |

FOREIGN PATENT DOCUMENTS

| | | |
|---|---|---|
| 1175046 | 9/1957 | Germany . |
| 1152906 | 8/1963 | Germany . |
| 1500206 | 7/1969 | Germany . |
| 7718438 | 9/1977 | Germany . |
| 8702966 | 7/1987 | Germany . |
| 4105088 | 8/1991 | Germany . |
| 9222932 | 12/1992 | Germany . |
| 4300441 | 2/1993 | Germany . |
| 4315701 | 11/1994 | Germany . |

*Primary Examiner*—Denise L. Ferensic
*Assistant Examiner*—Ramyar Farid
*Attorney, Agent, or Firm*—Robert W. Becker & Associates

[57] ABSTRACT

A valve for venting a container has a valve housing with an annular chamber. A ring member with a first axial and a second axial end is arranged in the annular chamber. The ring member has a first sealing lip at the first axial end and a second sealing lip at the second axial end. A first channel and a second channel extend axially along the ring member for venting the container. The first channel vents in a first direction and the second channel vents in a second direction opposite the first direction. The first sealing lip closes off the first channel such that the first sealing lip and the first channel function as a relief valve. The second sealing lip closes off the second channel such that the second sealing lip and the second channel function as a relief valve.

8 Claims, 3 Drawing Sheets

VALVE FOR VENTING A CONTAINER

BACKGROUND OF THE INVENTION

The present invention relates to a valve for venting a container, especially a fuel tank of a hand-held working tool.

A sealing valve for container openings is disclosed in international application WO 92/22932 which is comprised of a lid portion and an integral circumferential wall portion. The sealing valve is in the shape of a cup and has a circumferential sealing bead at the inner side of the cup wall which comprises a defined sealing edge. At the inner wall of the cup control channels are formed which extend from the cover to the sealing bead and which allow for deformation of the circumferential wall portion upon excess pressure within the container so that the sealing edge is lifted off the contact surface and allows for pressure relief.

The known arrangement is simple in its design and reliable in its operation. However, it only allows for the pressure relief of a hollow space, but does not allow for introduction of air into the hollow space. For two such elements allowing pressure compensation in two opposite directions there is, in general, no space available, especially not when the corresponding valve is designed to fit into a closure means of a container opening.

It is therefore an object of the present invention to provide a valve for pressure compensation of a container which is simple in its construction and reliable in its operation and which furthermore requires only a minimal amount of space.

SUMMARY OF THE INVENTION

The valve for venting a container, according to the present invention, is primarily characterized by:

A valve housing comprising an annular chamber;

A ring member arranged in the annular chamber;

The ring member having a first axial end and a second axial end;

The ring member having a first sealing lip at the first axial end and a second sealing lip at the second axial end;

A first channel and a second channel extending axially along the ring member for venting the container;

The first channel venting in a first direction and the second channel venting in a second direction opposite the first direction;

The first sealing lip closing off the first channel such that the first sealing lip and the first channel function as a relief valve; and The second sealing lip closing off the second channel such that the second sealing lip and the second channel function as a relief valve.

Preferably, the ring member is comprised of an elastomer and the first and the second sealing lips are an integral part of the ring member.

Advantageously, the first and second sealing lips are annular. The annular chamber has a radially outer mantle surface and a radially inner mantle surface. The first sealing lip rests at the radially outer mantle surface and the second sealing lip surrounds the radially inner mantle surface with prestress.

Expediently, the valve housing is comprised of a cylindrical part and a peg concentrically positioned inside the cylindrical part. The annular chamber is located between the cylindrical part and the peg. Preferably, the cylindrical part has a first end with a radially extending wall. The peg preferably has a first end resting on the radial wall.

Advantageously, the radial wall has at least one opening connecting the annular chamber to the exterior of the cylindrical part. It is also possible that the cylindrical part has at least one opening connecting the annular chamber to the exterior of the cylindrical part.

Preferably, the peg has a radial collar facing the radial wall. The radial collar has a peripheral surface press-fitted in the cylindrical part.

Advantageously, the peg comprises a section of reduced diameter and the ring member is connected to the peg within the section of reduced diameter.

Preferably, the peg comprises a second end opposite the first end and the second end has a radial projection projecting radially outwardly across a radial surface of the ring member.

In yet another embodiment of the present invention the section of reduced diameter has at least one axially extending groove.

Preferably, the second sealing lip is comprised of a cylindrical section surrounding at a radial distance the peg and having a free end with a radially inwardly extending sealing bead.

In a further embodiment of the present invention the peg comprises a centrally arranged blind hole.

Advantageously, the first sealing lip has a conical, radially outwardly extending contour.

In yet another embodiment of the present invention the valve housing is a unitary part comprised of an integral peg and an integral sleeve. The annular chamber is a stepped annular groove defined between the integral peg and the integral sleeve.

Preferably, the ring member has an outer mantle surface with which the ring member is clamped within the integral sleeve, whereby the ring member rests at a step of the stepped annular groove.

Advantageously, the first and the second channels are formed between the ring member and an outer mantle surface of the integral peg and the first and second channels are positioned diametrically opposite one another relative to the integral peg.

Preferably, the ring member comprises cutouts forming the first and second channels, wherein the cutouts extend over the entire axial length of the ring member and, in the peripheral direction, extend over an angular distance of substantially 80°. The first and second sealing lips are positioned at opposite ends of the first and second channels, respectively.

The present invention also relates to a combination of a valve for venting a fuel tank and a cup-shaped lid for a fuel tank, wherein the valve comprises:

a) a valve housing comprising an annular chamber;

b) a ring member arranged in the annular chamber, the ring member having a first axial end and a second axial end;

c) the ring member having a first sealing lip at the first end and a second sealing lip at the second end;

d) a first channel and a second channel extending axially along the ring member for venting the container;

e) the first channel venting in a first direction and the second channel venting in a second direction opposite the first direction;

f) the first sealing lip closing off the first channel such that the first sealing lip and the first channel function as a relief valve;

g) the second sealing lip closing off the second channel such that the second sealing lip and the second channel function as a relief valve; and h) the valve housing positioned in the cup-shaped lid.

Preferably, the valve housing is an insert positive-lockingly secured in the cup-shaped lid.

Advantageously, the cup-shaped lid has a bottom. Between the insert and the bottom a hollow space is provided. The bottom has at least one opening for connecting the hollow space with the exterior of the cup-shaped lid.

The combination preferably further comprises a filter of sintered plastic material positioned in the hollow space. The plastic material is preferably polyethylene having a pore size of substantially 50 µm.

The essential advantages of the invention are to be seen in that in a simple manner a valve is embodied that can be used for venting the container in both directions, i.e., pressure relief of excess pressure within the container as well as compensation of a vacuum within the container. Furthermore, a defined opening pressure can be preset with the constructive design of the valve.

In a preferred embodiment of the invention the ring member and the two sealing lips are integrally formed and are comprised of an elastomer. In this manner, the number of required parts is reduced as well as the resulting expenditure for assembly. According to a first variant of the invention, the sealing lips are annular and a first sealing lip rests at an outer mantle surface of the annular chamber while a second sealing lip surrounds an inner mantle surface of the annular chamber with prestress. Preferably, the valve housing is comprised of two concentric components one of which being substantially a cylinder and the other a peg. For facilitating mounting of the peg within the cylinder, it is advantageous to provide the peg with a blind hole the open end of which faces the filter. In order to determine in a simple manner the insertion depth of the peg into the cylinder, it is expedient to provide the cylinder at one end with a radial wall on which the peg will rest. In order to provide communication of the annular chamber with the hollow space of the tank, the radial wall of the cylinder or the cylinder wall itself is provided with at least one opening for connecting the hollow space within the cylinder to the exterior. For fastening the peg within the cylinder without additional fastening means, it is advantageous that the peg be provided with a radial collar the outer periphery of which is secured at the cylinder by press fit. The press fit between these two components ensures a safe fastening and a permanent seat.

Expediently, the peg is provided with a section of reduced diameter whereby in this section the ring member is attached. Due to this measure it is achieved that for a reduced diameter a sufficient stiffness of the ring member is provided which, in turn, ensures the secure fastening of the ring member at the peg. In order to securely position the ring member during insertion of the peg into the cylinder, the forward end of the peg is provided with a radial projection which engages behind a radial surface of the annular member. Since the ring member is elastically stretchable, it can be easily mounted at (slipped onto) the integral section of the peg.

The first sealing lip preferably has a conically tapering contour whereby the sealing lip due to its elasticity rests at the outer mantle surface of the annular chamber. The second sealing lip comprises a cylindrical section that surrounds the peg at a radial distance and has a radially inwardly oriented sealing bead at its forward end. In order to provide for a connection between the exterior and the space defined between the second sealing lip and the peg, at least one axially extending groove is provided within the section of the peg onto which the ring member is mounted.

According to a second embodiment the valve housing is of an integral construction. The annular chamber is defined by a stepped annular groove between the integral structure of peg and sleeve whereby at the bottom of the groove an opening is provided which connects the annular chamber with the exterior of the valve housing. Due to the integral construction of the valve housing the number of parts to be manufactured and assembled is further reduced, and this results in a reduction of manufacturing costs. For fastening the annular member, no separate means are required because preferably the annular member with its exterior circumferential surface is clamped at the sleeve and for an axial fixation is resting on a step of the stepped annular groove. Expediently, between the ring member and the peg the two inventive channels are formed which are positioned diametrically opposite one another at the mantle surface of the peg. In this manner, for a minimal constructive size and without enlarging the radial dimensions separate channels are provided. In order to avoid additional machining steps for the formation of the channels, the channels are formed during injection molding of the elastic material of the ring member and it is advantageous to provide these channels as cutouts within the ring member. The channels can extend over an angular distance of approximately 80° and over the entire axial length of the ring member whereby the sealing lips are positioned at opposite ends of the channels.

For a fuel tank of a hand-held working tool, such as, for example, a motor chainsaw, a trimmer, etc., the valve is preferably arranged within the lid of the fuel tank for providing pressure compensation. Such a lid is conventionally cup-shaped. In this context, it is especially advantageous that the valve housing is in the form of an insert concentrically arranged within the lid and positive-lockingly secured within the lid. Such an insert can have a multitude of functions, for example, can serve to securely hold a sealing ring positioned within the lid and for fastening a cable, a chain etc. for a holding bracket (handle). Between the insert which forms the valve housing and the bottom of the lid a hollow space is provided which is connected with at least one opening to the exterior, i.e., to the ambient air. Expediently, this opening is provided at the bottom of the cup-shaped lid.

In order to prevent during pressure compensation of a vacuum within the tank the introduction of dirt or moisture and during pressure relief of the tank the release of fuel, it is advantageous to position a filter in the hollow space, preferably made of a sintered plastic material. An especially suitable filter material is polyethylene of a pore size of approximately 50 µm.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiment utilizing FIGS. 1 through 5.

Figure 1:
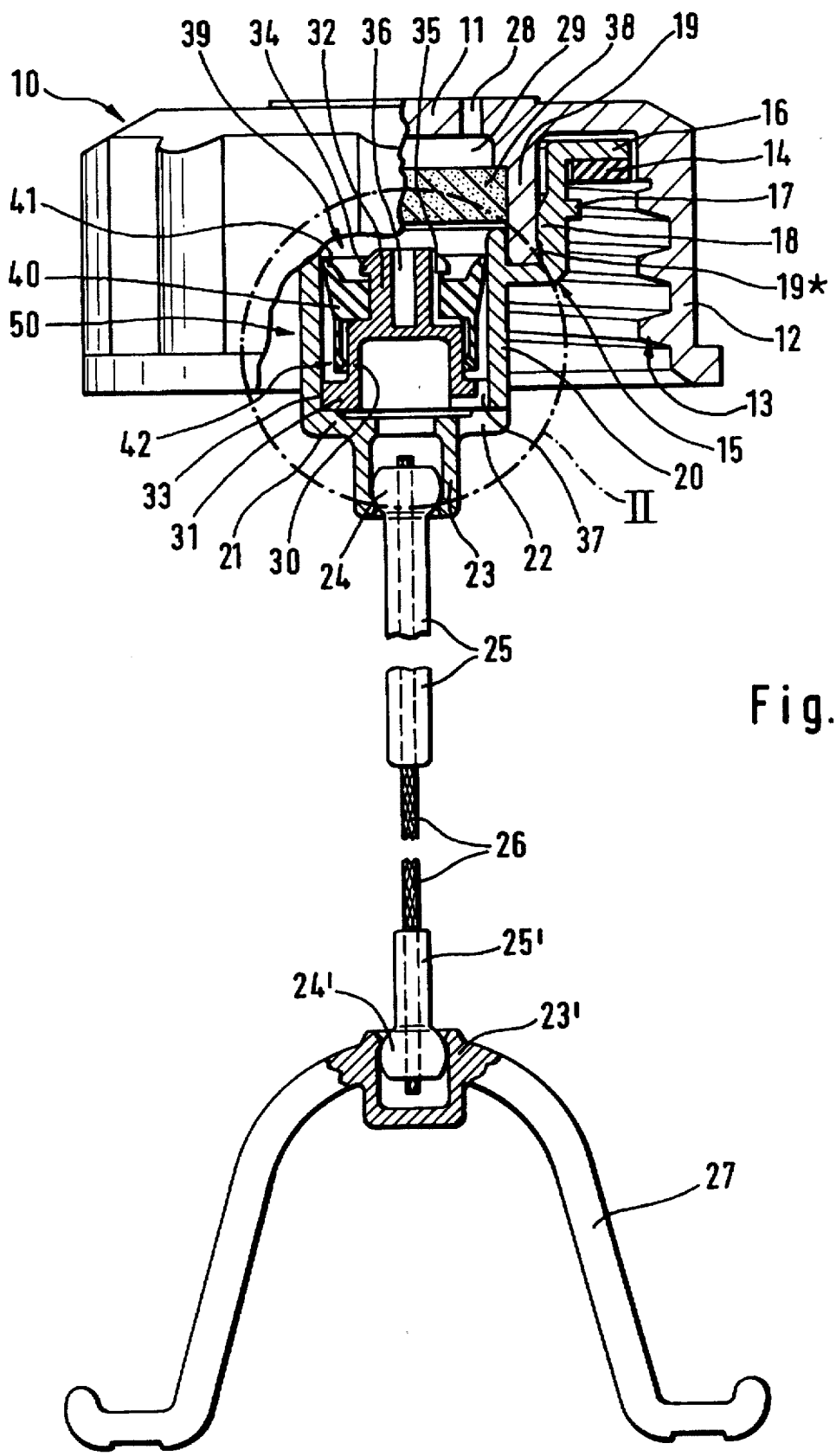
FIG. 1 shows an axial section of a lid of a fuel tank.
Figure 2:
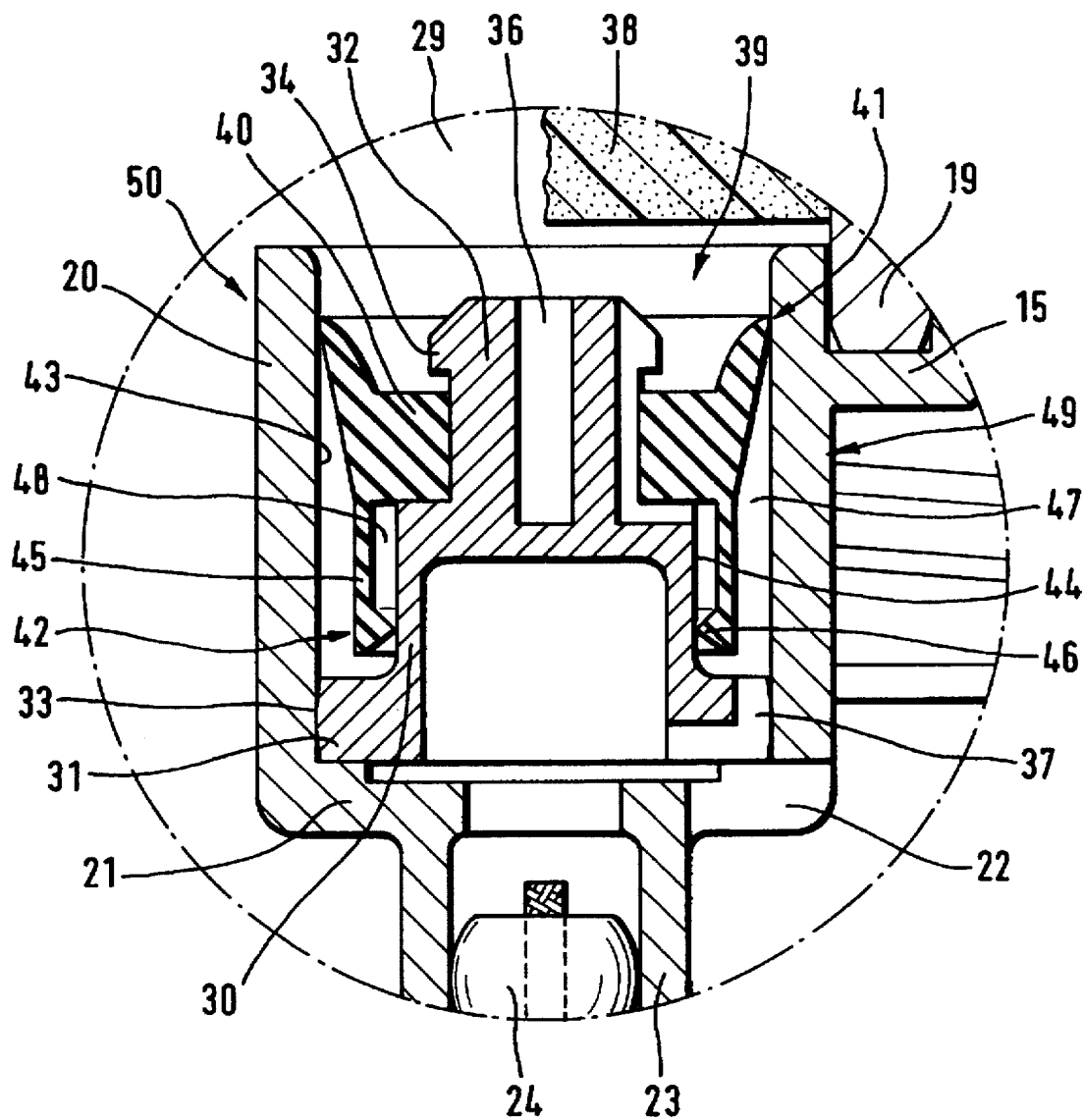
FIG. 2 shows an enlarged view of the detail II of FIG.

The closure lid 10 represented in FIG. 1 is substantially cup-shaped and comprises a bottom 11 as well as a cylindrical wall 12 having at its inner side an inner thread 13. Perpendicular to the bottom 11 extends a concentrically arranged annular wall 19 the forward end of which is provided with a radially outwardly oriented bead 19*. An insert 15 is connected to the annular wall 19 whereby a radially inwardly oriented projection 18 of the insert 15 positive-lockingly engages behind the bead 19*. The insert 15 comprises a flange 16 neighboring the bottom 11 as well as a collar 17 arranged at an axial distance thereto whereby between the flange 16 and collar 17 a sealing ring 14 is securely held.

The insert 15 comprises furthermore a cylinder 20. The end facing the bottom 11 extends into the hollow space 29 delimited by the annular wall 19. In the bottom 11 an opening 28 is provided which connects the hollow space 29 with the exterior of the closure lid 10. A filter 38 is arranged within the hollow space 29. The filter is preferably comprised of sintered plastic material, for example, polyethylene of a pore size of approximately 50 μm.

The cylinder 20 has at an end thereof facing a non-represented fuel tank a radial wall 21 which has integrally formed thereat a receiving element 23 extending into the fuel tank. Within the receiving element 23 a spherical head 24 of an end piece 25 is provided to which is connected a rope 26. At the other end of the rope 26 a further end piece 25' with a head 24' is provided which is suspended from a receiving element 23' at a holding bracket 27.

Within the cylinder 20 a valve 50 is arranged that serves for venting (pressure relief, pressure compensation) of the fuel tank. This valve 50 is shown enlarged in FIG. 2 as a detail II of FIG. 1. The valve 50 comprises a valve housing 49 that is comprised of a peg 30 arranged within the cylinder 20. A radial collar 31 is integrally formed at the peg 30 and has a circumferential surface 33 slightly greater than the cylinder 20. Accordingly, the peg 30 is secured with press-fit within the cylinder 20. Between the peg 30 and the cylinder 20 an annular chamber 39 is formed in which a ring member 40' a sealing lip 41 and a second sealing lip 42 is positioned.

The ring member 40 and the first and second sealing lips 41, 42 are integrally formed and preferably comprised of a fluorocontaining rubber or nitrile rubber. A section 32 of reduced diameter is formed at the peg 30 in the direction of the forward end of the cylinder and the ring member 40 is fastened to the circumferential surface thereof by a clamping force resulting from the elasticity of the material. The forward end of the section 32 is provided with a projection 34 in the form of a bead so that a positive-locking connection of the ring member 40 with the section 32 results. The first sealing lip 41 extends conically in the direction of the outer mantle surface 43 of the annular chamber 39 and rests thereat with a certain prestress.

The second sealing lip 42 comprises a cylindrical section 45 which extends at a radial distance to the inner mantle surface 44 of the annular chamber 39 and thus defines a channel 48. In the vicinity of the exterior end of the cylindrical section 45 it comprises a radially inwardly oriented sealing bead 46 resting at the inner mantle surface 44 of the annular chamber 39 and closing off the channel 48. At the side facing the hollow space 29 a blind hole 36 is provided within the section 32 which serves for receiving a pin for the purpose of mounting the peg within the cylinder 20. The peg 30 which is provided with the ring member 40 is inserted to such an extent into the cylinder 20 until the radial collar 31 rests at the radial wall 21 of the cylinder 20.

Within the collar 31 an opening 37 is provided that overlaps with an opening 22 of the radial wall 21 so that the annular chamber 39 of the valve 50 is in communication with the interior space of the fuel tank.

Figure 3:
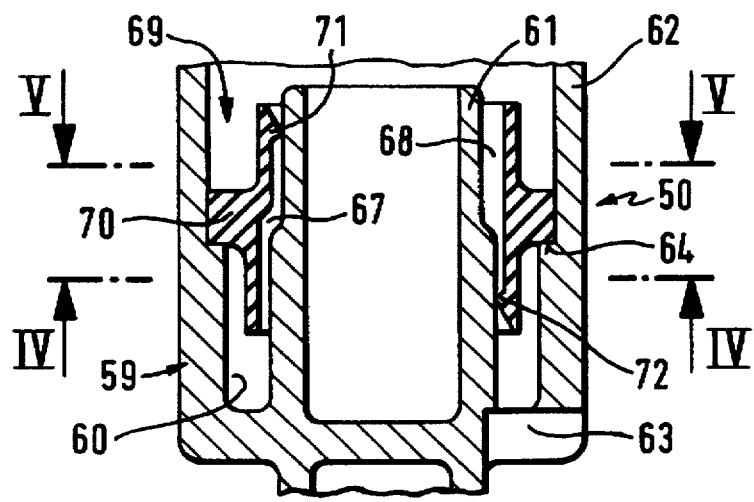
FIG. 3 shows a variant of the embodiment of FIG. 2.

FIG. 3 shows a second embodiment of the valve 50 whereby in a valve housing 59 an annular groove 60 is provided so that an outer sleeve 62 and an inner peg 61 are formed. The annular groove 60 comprises a step 64 at which the ring member 70 is axially secured such that the ring member 70 is clamped with its outer circumferential surface against the inner wall of the sleeve 62. At the bottom of the annular groove 60 an opening 63 is provided within the valve housing 59 so that a connection between the annular groove 60 and the exterior of the valve housing 59 is provided. The ring member 70, as shown in the left half of FIG. 3, extends at a certain distance to the contour of the peg 61 so that a channel 67 is formed which extends over the entire axial length of the ring member 70. At the upper end of the ring member 70 a sealing lip 71 is arranged which rests at the peg 61. As shown in the right half of FIG. 3, the ring member 70 also extends at a distance to the peg 61 so that a further channel 68 is formed the lower end of which is closed off by the sealing lip 72 formed as an integral part of the ring member 70.

Figure 4:
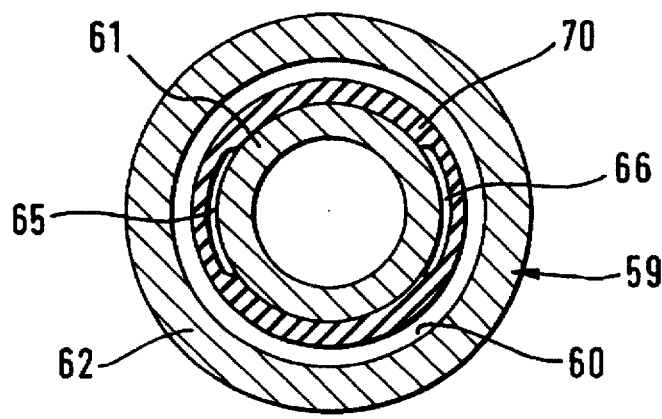
FIG. 4 shows a section along the line IV—IV of FIG. 3.
Figure 5:
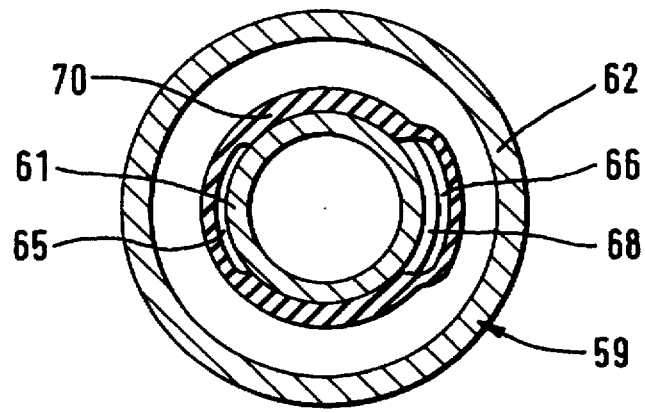
FIG. 5 shows a section along the line V—V of FIG. 3.

The section along the line IV—IV of FIG. 3 is shown in FIG. 4. This representation shows that the ring member 70 rests on a large portion of the circumference of the peg 61 and the cutouts 65 and 66 within the ring member 70 provide channels which are indicated in FIG. 3 with reference numeral 67 and 68. FIG. 5 shows a section along the line V—V of FIG. 3 whereby for same features the same reference numerals as in FIG. 3 are employed. As can be seen clearly in FIGS. 3 and 5, the cutouts 65 and 66 extend over an angular distance of approximately 80° and over the entire axial length of the ring member 70. The sealing lip 71 at the upper end of the ring member 70 serves as a pressure relief valve while the sealing lip 72 at the lower end of the ring member 70 serves also in the manner of a pressure relief valve for pressure compensation allowing flow of air into the tank.

When excess pressure is present within the fuel tank, pressure relief is achieved such that due to the pressure present within the tank and also present within the annular channel 47 between the ring member 40 and the cylinder 20, respectively, within the channel 67, the first sealing lip 41 or 71 is lifted off the mantle surface 43, respectively, the peg 61 so that a certain volume can be released into the hollow space 29. The filter 38 prevents leakage of fuel if not only gaseous components exit through the pressure relief valve.

When a vacuum is present within the fuel tank, which vacuum surpasses a certain pressure difference to the surrounding atmospheric pressure, the pressure within the channel 48, respectively, the channel 68 causes lifting of the sealing bead 46 off the mantle surface 44, respectively, of the sealing lip 72 off the peg 61 so that a certain volume of ambient air can be introduced into the fuel tank until the return force of the second sealing lip 42 is sufficient to return the sealing bead 46 onto the mantle surface 44, respectively, the sealing lip 72 onto the peg 61 so that in this manner the valve 50 is again closed.

The respective opening pressure of the valve 50 at the sealing lips 41 and 42, respectively, 71 and 72 can be selected differently and is preferably within the range of 200 mbar to 500 mbar.

The present invention is, of course, in no way restricted to the specific disclosure of the specification and drawings, but also encompasses any modifications within the scope of the appended claims.

What I claim is:

1. A valve for venting a container, said valve comprising:
   a one-piece valve housing including two parts that are concentrically positioned relative to one another and define an annular chamber therebetween;
   said two parts comprising an inner integral peg and an outer integral sleeve;
   said annular chamber including a step portion located on said outer integral sleeve;
   a ring member arranged in said annular chamber;
   said ring member having a first axial end and a second axial end;
   said ring member having a first sealing lip at said first axial end and a second sealing lip at said second axial end;
   a first channel and a second channel extending axially along said ring member for venting the container;
   said first channel venting in a first direction and said second channel venting in a second direction opposite said first direction;
   said first sealing lip closing off said first channel such that said first sealing lip and said first channel function as a relief valve;
   said second sealing lip closing off said second channel such that said second sealing lip and said second channel function as a relief valve;
   said inner integral peg having a first surface cooperating with said first sealing lip and having a second surface cooperating with said second sealing lip, wherein a portion of said ring member is positioned on said step portion;
   said first sealing lip acting radially on said first surface for closing of said first channel and said second sealing lip acting radially on said second surface for closing off said second channel; and
   said ring member, including said first and said second sealing lips, and said first and said second channels completely enclosed by said annular chamber.

2. A valve according to claim 1, wherein said ring member is comprised of an elastomer and wherein said first and said second sealing lips are an integral part of said ring member.

3. A valve according to claim 1, wherein said first and said second channels are formed between said ring member and an outer mantle surface of said integral peg and wherein said first and said second channels are positioned diametrically opposite one another relative to said integral peg.

4. A valve according to claim 3, wherein said ring member comprises cutouts forming said first and said second channels, wherein said cutouts extend over the entire axial length of said ring member and, in the peripheral direction, extend over an angular distance of substantially 80°, wherein said first and second sealing lips are positioned at opposite ends of said first and said second channels, respectively.

5. A combination of a valve for venting a fuel tank and a cup-shaped lid for a fuel tank, wherein said valve comprises:
   a one-piece valve housing including two parts that are concentrically positioned relative to one another and define an annular chamber therebetween;
   said two parts comprising an inner integral peg and an outer integral sleeve;
   said annular chamber including a step portion located on said outer integral sleeve;
   a ring member arranged in said annular chamber, said ring member having a first axial end and a second axial end;
   said ring member having a first sealing lip at said first axial end and a second sealing lip at said second axial end;
   a first channel and a second channel extending axially along said ring member for venting the container;
   said first channel venting in a first direction and said second channel venting in a second direction opposite said first direction;
   said first sealing lip closing off said first channel such that said first sealing lip and said first channel function as a relief valve;
   said second sealing lip closing off said second channel such that said second sealing lip and said second channel function as a relief valve;
   said valve housing positioned in said cup-shaped lid;
   said inner integral peg having a first surface cooperating with said first sealing lip and having a second surface cooperating with said second sealing lip, wherein a portion of said ring member is positioned on said step portion;
   said first sealing lip acting radially on said first surface for closing of said first channel and said second sealing lip acting radially on said second surface for closing off said second channel; and
   said ring member, including said first and said second sealing lips, and said first and said second channels completely enclosed by said annular chamber.

6. A combination according to claim 5, wherein said valve housing is an insert positive-lockingly secured in said cup-shaped lid.

7. A combination according to claim 6, wherein said cup-shaped lid has a bottom and wherein between said insert and said bottom a hollow space is provided and wherein said bottom has at least one opening for connecting said hollow space with the exterior of said cup-shaped lid.

8. A combination according to claim 5, further comprising a filter of sintered plastic material positioned in said hollow space, wherein the plastic material is polyethylene having a pore size of substantially 50 μm.

* * * * *